July 19, 1932.  F. L. HOPPER  1,868,105
APPARATUS FOR MEASURING REVERBERATION TIME
Filed April 10, 1931
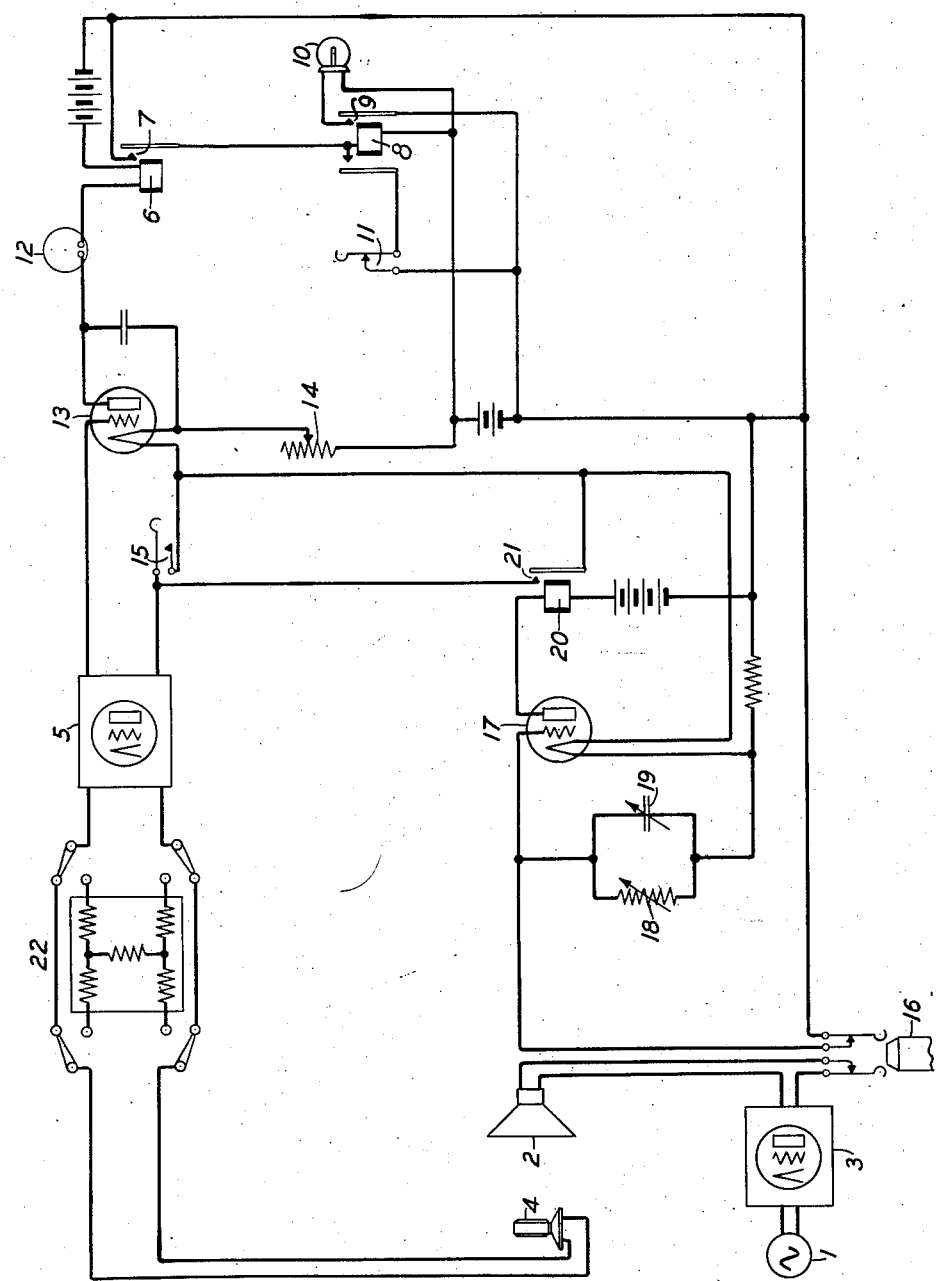
INVENTOR
F.L. HOPPER
BY
ATTORNEY Patented July 19, 1932

1,868,105

UNITED STATES PATENT OFFICE

FRANCIS L. HOPPER, OF PASADENA, CALIFORNIA, ASSIGNOR TO ELECTRICAL RESEARCH PRODUCTS INC., OF NEW YORK, N. Y., A CORPORATION OF DELAWARE

APPARATUS FOR MEASURING REVERBERATION TIME

Application filed April 10, 1931. Serial No. 529,274.

This invention relates generally to measuring systems and more particularly to devices for determining the acoustical conditions of enclosed and open spaces.

The principal object of this invention is to provide a precision method of and apparatus for measuring the time of decay of the energy of sound waves. When used to measure sound wave decay, this method determines what is known as the reverberation time of the enclosed or open spaces under consideration. This time, as usually defined, is the interval elapsing while the average sound intensity of the residual sound decays 60 db. (decibels) or, in other words, from any given value to one one-millionth of that value. A decibel (abbreviated db.) is defined by the relation $$N = 10 \log_{10} \frac{P_1}{P_2}$$

where N is the number of decibels by which the powers $P_1$ and $P_2$ differ.

A further object is to provide apparatus capable of giving a direct reading of the time it takes the residual sound to deteriorate a determined amount.

The invention accomplishes the above objects by providing a device comprising sound detector apparatus including a circuit containing means for indicating the condition of the circuit, the operation of which is controlled by time delay apparatus after the source of sound has been cut off. By adjusting the time delay device so that it operates to control the detector circuit at the instant the current falls to the minimum required to operate the indicating device, a measure of the time of decay of the residual sound is obtained. For the purpose of measuring the reverberation time directly, the time delay device is calibrated in units of time and the minimum operating current for the indicating device corresponds to the residual sound energy after it has decayed 60 db.

In the drawing, 1 represents an oscillation generator for supplying a loud speaker 2 with energy of the desired constant or warble frequency. This energy which is furnished by the oscillation generator 1 is amplified by amplifier 3. The energy is picked up by a condenser type transmitter 4 (usually associated with its own amplifier), is amplified by an amplifier 5 and finally energizes a relay 6 to close a contact 7. The closing of the contact 7 closes a circuit including a relay 8 causing it to operate and close contact 9 which lights a signal light 10. Relay 8 locks up and may be released by opening a key 11. Connected in series with the winding of the relay 6 is a milliammeter 12 and a tube 13 having a variable resistance 14 in the filament circuit. A switch 15 between the amplifier 5 and the relay 6 is provided for closing the circuit while the relay 6 is being adjusted. A button switch 16 is provided for simultaneously short-circuiting loud speaker 2 and opening a circuit containing a relay 20, a vacuum tube 17, a variable resistance 18 and a variable capacity 19. Opening this circuit allows the grid upon which has been placed a high bias to assume the potential of the filament in a predetermined length of time through the variable resistance 18 and the variable capacity 19. The space current in the tube 17 then builds up and operates a relay 20 to close contact 21 thus closing the detector circuit. By adjusting the variable resistance 18 and the variable capacity 19 so that the relay 20 operates to close the detector circuit at the instant the sound level due to reverberation has fallen to the required level, a measure of the time of decay of the residual sound is obtained.

The operation of the meter is as follows: A suitable level of acoustic energy is chosen according to the nature of the space under test, the amount of extraneous noise, capacity of the loud speaker, etc. The energy is first brought to a steady state at the desired level by energizing the loud speaker 2 with the oscillator 1. With the oscillator 1 maintaining this steady state an attenuator 22 whose constants are such as to permit a variation of 60 db. in the energy output of amplifier 5 is inserted in the detector circuit. Care should be taken that the constant sound intensity is at a high enough level so that a 60 db. drop in the detector input will not reduce the circuit level below the level produced by extraneous noise in the room. Close switch 15 so the time delay circuit is shorted out. With the attenuator 22 inserted, the gain of the amplifier 13 is varied by means of the variable resistance 14 until relay 6 operates to close contact 7. The closing of contact 7 closes a circuit including relay 8 causing it to operate and close contact 9 which lights the signal lamp 10. A milliammeter 12 is furnished in the plate circuit of the tube in order to note the current corresponding to the 60 db. loss. It is also used to observe visually the nature of the sound decay rate. It may also be used to indicate the change in plate current necessary to cause relay 6 to operate.

The detector circuit has by the above means been prepared so that the minimum current necessary for the operation of relay 6, when connected to said circuit corresponds to an energy level 60 db. below the original steady state produced by the loud speaker 2. Thus, if the relay 6 is connected to the detector circuit by means of the time delay circuit at predetermined intervals after the de-energizing of loud speaker 2, it will operate if the energy in the detector circuit has decayed 60 db. or less.

The attenuator 22 is then removed from the microphone circuit and switch 15 is opened leaving the detector circuit open. Release relay 8 by opening key 11 thus causing signal light 10 to go out. The device is now ready to proceed with the test. The energy in the room or space to be tested is again brought to a steady state at the same level of acoustic energy for which relay 6 was adjusted by energizing the loud speaker 2 with the oscillator 1. During this operation the time delay circuit containing tube 17, relay 20, variable resistance 18 and variable capacity 19 is closed through switch 16. A high bias is built up on the grid of tube 17, sufficient bias being used to block the space current and render relay 20 inoperative. By pressing the button on switch 16 when the room has been raised to the desired steady state, the loud speaker 2 is disconnected from the source of sound and simultaneously the time delay circuit is opened. The opening of this circuit allows the high bias on the grid of tube 17 to leak away at a predetermined rate through the variable resistance 18 and the variable capacity 19 until the grid has assumed the potential of the filament. At the same time the space current builds up and operates relay 20 to close contact 21 thus closing the detector circuit. At the same time, if the sound energy has fallen 60 db. or less below the original steady state due to reverberation at the instant the detector circuit is closed, the current in said circuit would operate relay 6. The operation of relay 6 closes a circuit containing a relay 8 causing it to operate closing switch 9 whereupon signal light 10 is lighted.

Relay 8 locks up thus keeping the signal light 10 lighted. By adjusting the condenser 19 and resistance 18 and repeating the operation, various time delays in the closing of contact 21 may be obtained until the correct one for the operation of relay 6 at its minimum operating current is found. Say the reverberation time of the room is one second. If the delay circuit is set for 1.1 seconds, relay 6 will not operate since the intensity of the sound has dropped more than 60 db. before the relay 6 circuit is closed. The time delay is then gradually reduced until relay 6 just operates, the time of reverberation will then be the same as that of the delay circuit.

The time delay circuit is calibrated in terms of time against a chronograph. Should it be desired to measure the time of reverberation directly, the time delay device is calibrated in units of time and the minimum operating current for relay 6 corresponds to the residual sound energy after it has decayed 60 db.

What is claimed is:

1. In a measuring device the combination with a source of sound energy, means for de-energizing said sound source, a sound detector for translating sounds from said source into electric currents, means in said detecting circuit operative when said currents have decayed to a predetermined value, said circuit being open during the period of measurement, and means operative to close said circuit at the same time that the currents have decayed to said predetermined level in order to operate said first operative means, said means comprising a time delay circuit.

2. In a measuring device the combination with a source of sound energy, means for de-energizing said sound source, a sound detector for translating sounds from said source into electric currents, relay means operative when said currents have decayed to a predetermined value, and means for determining the interval of time during which the wave energy from the source decays to the predetermined value, said latter means comprising a vacuum tube and a variable resistance and capacity, said variable resistance and capacity being adjustable.

3. In a measuring device the combination with a source of sound energy, a sound detector for translating sound from said source into electric currents, amplifying means for amplifying said currents, means operative when said currents have decayed to a predetermined value, said circuit being open between said detecting means and said current operative means during the period of measurement, means to close said circuit when the currents have decayed to said predetermined value, time delay means for controlling the operation of said circuit-closing means comprising a vacuum tube and a variable capacity and resistance, and means to set said time delay means in operation, said latter means also simultaneously deenergizing said sound source.

4. In a measuring device the combination with a source of sound energy, means for deenergizing said source, a sound detector for translating the sounds from said source into electrical currents, an amplifier for amplifying said currents, and means in the output circuit of said amplifier responsive to a minimum predetermined current and means associated with the input of said amplifier for rendering said amplifier and responsive means inactive until the maximum current available is the minimum determined value.

5. In a measuring device, the combination with a source of sound energy, means for deenergizing said sound source, a sound detector for translating sounds from said source into electric currents, means in said detecting circuit operative when said currents have decayed to a predetermined value, said circuit being open during the period of measurement, and means operative to close said circuit at predetermined time intervals after deenergizing said sound source, said latter means comprising a time delay circuit.

In witness whereof, I hereunto subscribe my name this 2nd day of April, 1931.

FRANCIS L. HOPPER.